June 6, 1944.  F. F. SEGESMAN  2,350,832
ELECTRICAL DEPTH MARKER
Filed Feb. 21, 1941
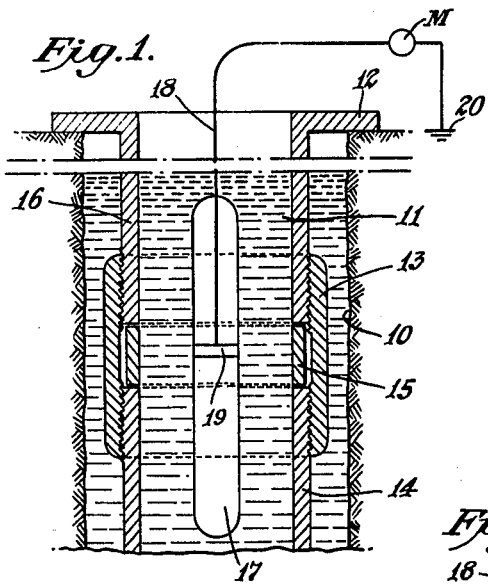
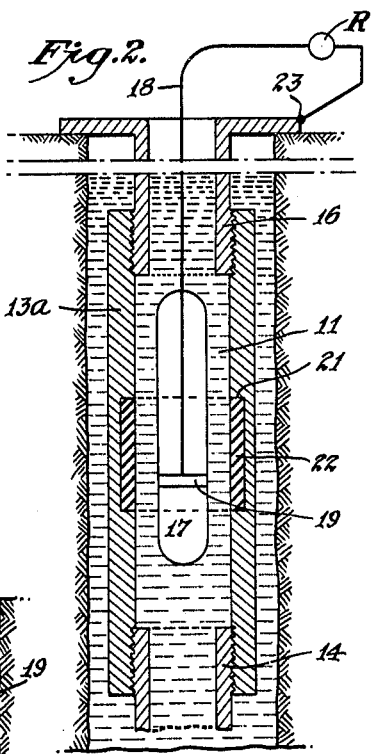
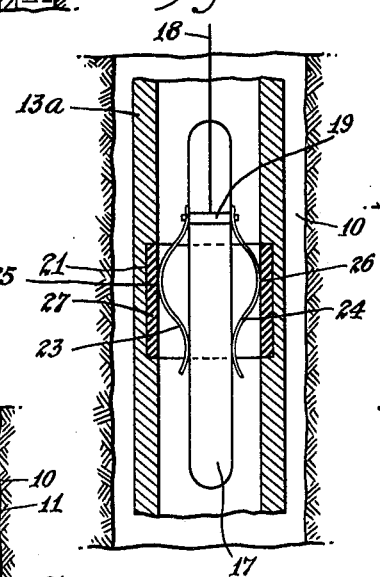
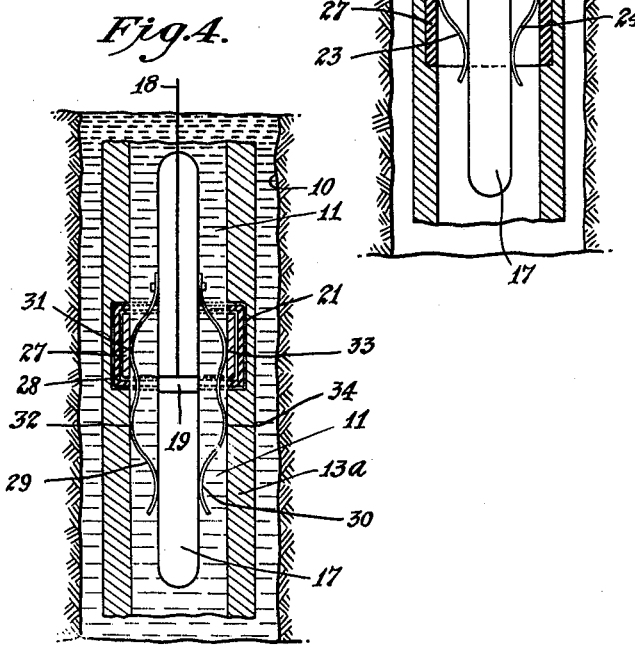
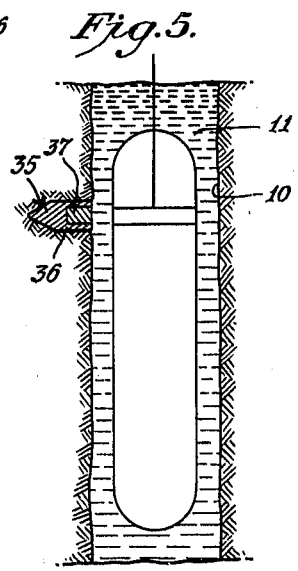
INVENTOR
Francis F. Segesman
BY
Noquet, Neary & Campbell
ATTORNEYS Patented June 6, 1944

2,350,832

UNITED STATES PATENT OFFICE 2,350,832

ELECTRICAL DEPTH MARKER

Francis F. Segesman, Freer, Tex., assignor to Schlumberger Well Surveying Corporation, Houston, Tex., a corporation of Delaware Application February 21, 1941, Serial No. 379,983

4 Claims. (Cl. 177—311)

The present invention relates to depth measurements and more particularly to methods and apparatus for establishing a point or points of reference in an inaccessible place such as a bore hole, for example, to which depth measurements therein may be related.

In the present day drilling of oil wells the trend is toward deeper holes and holes in excess of two miles in depth are becoming common. Inasmuch as a productive zone may be only a few feet in depth and the difference between a good producer and an unsatisfactory one may depend on measurements having a tolerance of only two feet, depth measurements must be made with a maximum error of abut .02 percent. Such accuracy is very difficult to attain at the surface of the earth and in an inaccessible place such as a bore hole it is next to impossible of achievement with the methods now in use.

Drill pipe measurements, which are nearly always made, have not been found satisfactory even when the measuring chain is accurate and properly handled. For one thing, the pipe sections are measured at the surface, and different measurements are obtained depending on whether the pipe is in suspension on the hook or standing or lying on the pipe rack. Further, depth measurements made in this fashion are in error because they do not take into account the actual temperature of the pipe when in the hole or the fact that during drilling operations part of the weight of the pipe is carried by the derrick and part is on the drill bit.

Similar errors are to be expected when measurements are made from the top of the bore hole by means of cables or wire lines. Cables and lines of this type stretch when under tension and when subjected to the temperature variations encountered in the bore hole. They also tend to take the shortest path through the hole so that they do not provide accurate measurements at great depths.

It is an object of the invention, accordingly, to establish a point or points of reference at a predetermined depth or depths in a bore hole, to which depth measurements therein may be related whereby the above noted errors in depth measurements may be substantially eliminated.

Another object of the invention is to provide a method and apparatus wherein one or more markers are established at predetermined known or assumed depths in a bore hole, which marker or markers may subsequently be used as a reference point or points in depth measurements.

A further object of the invention is to provide a method and apparatus of the above character in which one or more markers are established in a string of casing in a well which may subsequently be employed as a reference point or points for depth measurements therein.

Still another object of the invention is to provide a marker which produces a marked electrical anomaly at a predetermined level in a bore hole whereby it may be located by electrical means such as conventional electrical well logging apparatus, for example.

Additional objects and advantages will become apparent from the following detailed description of several preferred embodiments taken in connection with the accompanying drawing, in which:

Fig. 1 is a view in longitudinal section through a bore hole and casing illustrating a bore hole marker constructed according to the present invention;

Fig. 2 is a view in longitudinal section illustrating a bore hole marker constructed of insulating material;

Fig. 3 illustrates a modified form of the invention for use in bore holes which either contain no fluid or in which the fluid is relatively nonconductive;

Fig. 4 illustrates a modified form of bore hole marker which is adapted to be affixed to the casing within a bore hole; and Fig. 5 is a view in longitudinal section illustrating a bore hole marker which is adapted to be employed in an uncased bore hole.

In the illustrative embodiment shown in Fig. 1 of the drawing, a depth marker is produced by artificially creating a local electrochemical action at a predetermined depth in a string of casing. In this embodiment, no special fittings are required to establish a marker in the casing but conventional fittings may be used for this purpose.

Referring to Fig. 1, a bore hole 10 is shown in longitudinal section, containing a column of relatively conductive liquid 11 and within which is fitted a string of metallic casing 12, usually made of steel. At a predetermined position in the casing 12 where it is desired to establish a marker, a conventional type coupling 13 is threaded on the upper end of a pipe section 14, within which is fitted an annular ring 15, for example, whose outer diameter is slightly smaller than the outer diameter of the pipe section 14. The lower end of the next pipe section 16 is then tightly screwed into the coupling member 13, locking the ring 15 tightly in position.

In order to create a marked electrochemical action in the electrolyte constituted by the bore hole liquid 11, the ring 15 is made of a metal which is different from that of the pipe sections 14 and 16 and the coupling 13. For example, if the pipe sections 14 and 16 are made of steel, the ring 15 may be made of zinc. Under these conditions, the zinc ring 15 and the adjacent steel pipe sections 14 and 16 and the coupling 13 constitute a small short circuited battery in which the relatively conductive liquid 11 within the casing 12 comprises the electrolyte. By electrochemical action, an electric current flows through the bore hole liquid 11 in the vicinity of the ring 15, thereby setting up a localized potential distribution within the bore hole liquid 11 which may be effectively employed as a reference depth marker in the bore hole 10.

In making depth measurements utilizing the above potential distribution as a marker or point of reference, a body 17, which may be conventional well logging apparatus or any mechanical apparatus which is to be positioned at a predetermined level in the bore hole 10, is lowered thereinto on a cable 18 having at least one conductor therein. Mounted on the body 17 is an electrode 19 which is connected to the lower end of the conductor in the cable 18, the upper end of which is connected at the surface of the earth to one terminal of an instrument M for measuring potential difference, which may be a voltmeter or a potentiometer, for example. The other terminal of the instrument M may be connected to ground at the point 20 or, if desired, it may be connected to casing 12 at the surface of the earth.

As the body 17 is lowered into the bore hole, the reading of the potential indicating instrument M will remain substantially constant or will vary but slightly, until the electrode 19 moves into the potential distribution in the bore hole liquid 11 adjacent the ring 15. When that occurs, an appreciable change will be noted in the reading of the instrument M, indicating that the electrode 19 has reached the position of the ring 15. The body 17 may then be moved accurately to the desired level, distances being measured from the ring 15 as a point of reference.

Instead of using a continuous ring 15, strips or pieces of material might be employed with the same results. Similar results might also be obtained by electro-plating the inside of the pipe with a suitable metal different from the metal of which the pipe is made.

Fig. 2 illustrates another embodiment of the invention in which the marker is made of insulating material. In this embodiment a special type of coupling 13a is used to couple the pipe sections 14 and 16 together and it may be provided with an annular groove 21 therein within which an annular ring 22 of insulating material which forms the depth marker is adapted to be received. The marker 22 may be made of any suitable insulating material such as, for example, Bakelite, Micarta, mica or varnish, and may be of any desired thickness or length. In order to reduce the possibility of damage by mechanical operations carried out within the casing, it is preferred, but not essential, that the inside diameter of the marker 22 be not less than the inside diameter of the coupling 13a.

The marker 22 in this embodiment may be conveniently located by noting the changes in resistance or impedance between the electrode 19 and the ground 20 or the casing 12 as the body 17 is lowered into the bore hole. To this end an instrument R of any suitable type for measuring resistance or impedance is inserted in series with the conductor in the cable 18. If the measurements are made between the electrode 19 and the casing 12, the upper end of the conductor in the cable 18 should be grounded to the casing at the point 23, as shown in Fig. 2.

As the body 17 is lowered into the bore hole 10, the reading of the instrument R will be substantially constant until the electrode 19 moves into the vicinity of the marker 22. At that time the reading of the instrument R will change, indicating that the marker 22 has been reached. If the bore hole fluid 11 is homogeneous and the arrangement symmetrical, the maximum resistance reading will be observed when the electrode 19 is approximately at the center of the marker 22.

It will be apparent that other methods and means may be utilized for locating the position of the marker 22 than the resistance method described above. For example, apparatus for measuring impedance in bore holes, such as is described in prior Patent No. 2,038,046 might be used for this purpose. In general, any method or apparatus capable of detecting changes in the electrical characteristics of the material surrounding a bore hole can be used satisfactorily for locating the position of the marker 22.

In the event that the bore hole 10 either contains no fluid or contains a relatively non-conducting fluid, such as oil, for example, the apparatus illustrated in Fig. 3 may be used. In this modification the body 17, which it is desired to position at a given level in the more hole, is provided with flexible spring contact members 23 and 24, which are both connected to the conductor in the cable 18 and which are adapted to engage the interior wall of the casing at only the points 25 and 26, respectively.

If the spring contact members 23 and 24 are made of a metal which is different from the metal of the casing 12, a contact potential will be created as long as they are in contact with the casing 12, and it will be indicated by the instrument M. If the marker 27 is made of a still different material, the contact potential will either change or disappear when the contact members 23 and 24 come into contact with it, depending on the kind of material used, and the change in the reading of the instrument M will indicate that the body 17 has reached the level of the marker 27. In the event that the marker 27 is made of insulating material, it may be located by resistance or impedance measurements as described above in connection with Fig. 2.

Fig. 4 illustrates a modification of the apparatus shown in Fig. 1 in which the local electrochemical action which constitutes the depth marker is not produced until the body 17 reaches the depth at which the marker is located. In this embodiment, a layer of insulation 28 is provided between the metallic marker 27 and the recess 21 in the coupling member 13a. Under these conditions, the coupling 13a, the insulated marker 27 and the bore hole liquid 11 constitute essentially an open circuit battery and there is no current flow between the marker 27 and the coupling 13a.

In order to locate the marker 27 the body 17 is provided with a pair of spring contact members 29 and 30 which are adapted to engage the interior wall of the casing 12 only at the points 31 and 32, and 33 and 34, respectively.

The spring contact members 29 and 30 are insulated from the body 17 and the conductor within the cable 18.

In lowering the body 17 into the bore hole 10 on the cable 18, the reading of the instrument M will remain substantially constant as long as the contact points 31 and 32 on the spring contact member 29, and 33 and 34 on the spring contact member 30, are in engagement with the casing 12. However, as soon as the lower contact points 32 and 34 on the contact arms 29 and 30, respectively, engage the marker 27, current will flow between the marker 27 and the coupling 13a, creating a potential distribution in the bore hole liquid 11 which will produce a marked change in the reading of the instrument M.

If the length of the marker 27 is greater than the vertical distance between the contact points 31 and 32, the potential of the electrode 19 will return to its normal value when both the contact points 31 and 32 on the contact arm 29, and the contact points 33 and 34 on the contact arm 30 are in engagement with the marker 27. If the body 17 is lowered further into the casing 12 until the lower contact points 32 and 34 on the contact arms 29 and 30, respectively, are again in engagement with the coupling 13a, the potential of the electrode 19 will again be changed, producing a corresponding change in the reading of the instrument M. An important feature of this embodiment is that it provides two indications, one when the electrode 19 reaches the upper end of the marker, and a second when the electrode 19 reaches the lower end of the marker. It will also be noted that there is no current flow until the body 17 reaches the depth of the marker 27, so that no appreciable amount of corrosion in the casing 12 will result from its use.

The invention may also be applied to the positioning of a body in an uncased bore hole as shown in Fig. 5, in which a marker 35 is embedded in the wall of the bore hole 10 at a known or assumed depth therein. The marker 35 may be placed in position by shooting it from a perforating or sample taking gun of the type disclosed in prior Patent No. 2,055,506 or by any other suitable device for this purpose.

The marker 35 comprises a projectile formed of two disimilar metals 36 and 37, which, when in contact with the electrolyte constituted by the bore hole fluid 11, produces a localized flow of current through the bore hole liquid 11 in the vicinity of the marker 35. The apparatus for locating the position of the marker 35 may be the same as that used in the embodiment shown in Fig. 1 and depth measurements may be made as described above in connection with that figure.

Although the marker 35 is shown as comprising two metals, only a single metal might be used, if desired. In such case, a current flow will be set up by the different electrolytes that may be in contact with the metal comprising the marker.

It will be apparent that other apparatus may be used for locating the position of the reference marker in the bore hole in place of the potential or resistance measuring apparatus described above. For example, conventional well logging apparatus of the type disclosed in prior Patents Nos. 1,913,293 or 1,819,923 may be used for this purpose. Moreover, the location of the marker might be made in connection with mechanical operations of the type disclosed in prior Patents Nos. 1,927,664, 2,085,664 and 2,153,802.

While several specific marker materials have been suggested above, there are many others available which will suggest themselves to those skilled in the art. Where local electrochemical action is relied on as an indication of the level of the marker, the marker may be made of any metal which will result in a marked local action, having in mind the nature of the electrolyte in the bore hole and the material of which the casing is made. Where a change in an electrical property is relied on, it is necessary only that the electrical characteristics of the marker material be appreciably different from those of the casing.

It will be apparent from the foregoing that the invention provides a simple and effective method and apparatus for reducing discrepancies in depth measurements in deep bore holes or the like. By establishing one or more markers at predetermined known or assumed depths in the bore hole, to which depth measurements may be related, a much higher degree of accuracy is achieved.

Although several specific embodiments have been described above in detail, the invention is not intended to be limited thereto, but is susceptible of numerous changes in form and detail within the scope of the appended claims.

I claim:

1. A reference depth marker for use in a bore hole having a metallic casing and an electrolyte therein comprising a member electrically insulated from the casing at a predetermined depth therein, said member forming a portion of the wall of the casing and being made of a metal which is dissimilar to the metal of the casing.

2. In apparatus for measuring distances in a bore hole having a casing therein and containing an electrolyte, the combination of a member secured to the casing at a predetermined depth therein, said member being electrically insulated from the casing and being made of a metal which is dissimilar to the metal of the casing, means adapted to be moved through the bore hole in engagement with said casing for connecting the casing electrically to said member at said predetermined depth, an electrode associated with said connecting means and movable therewith, and means for obtaining indications of potential differences between said electrode and a reference point.

3. A reference depth marker for use in a bore hole having a metallic casing therein made up of at least two casing sections joined together by a coupling member, comprising, a ring member disposed between the ends of said casing sections, said ring member having substantially the same inside diameter as the casing and being made of a metal which is dissimilar to the metal of the casing.

4. A reference depth marker for use in a bore hole having a metallic casing therein, comprising, a ring-like member mounted in a recess formed in the casing, said member having substantially the same inside diameter as the casing and being made of a material having electrical properties that are different from those of the casing, and insulating material disposed in said recess between said member and the casing.

FRANCIS F. SEGESMAN.